UNITED STATES PATENT OFFICE.

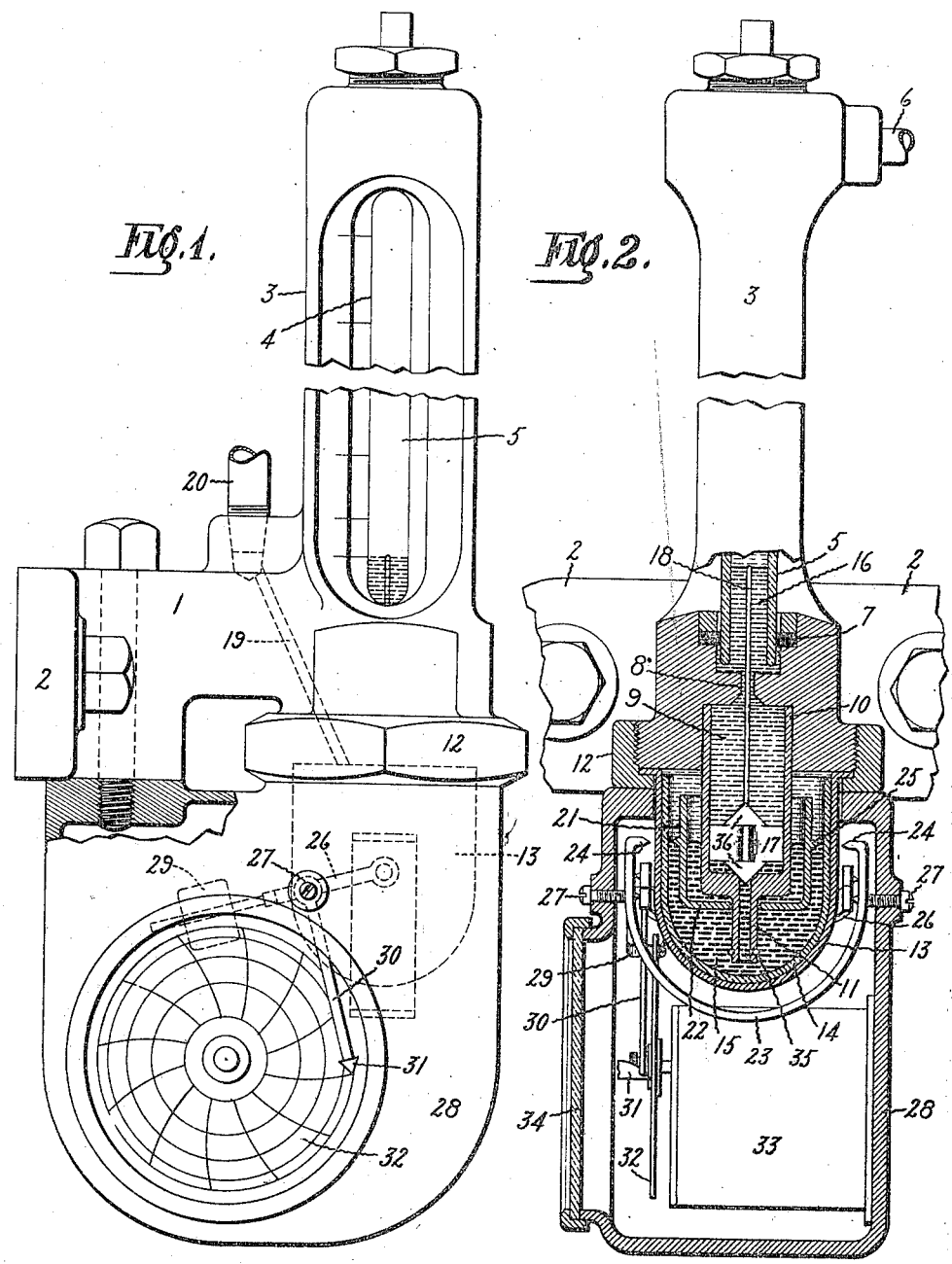

JAMES WILKINSON, OF BOSTON, MASSACHUSETTS, ASSIGNOR TO GENERAL ELECTRIC COMPANY, A CORPORATION OF NEW YORK.

RECORDING FLOW-METER.

1,092,966.  Specification of Letters Patent.  Patented Apr. 14, 1914.

Application filed October 11, 1912. Serial No. 725,174.

*To all whom it may concern:*

Be it known that I, JAMES WILKINSON, a citizen of the United States, residing at Boston, county of Suffolk, State of Massachusetts, have invented certain new and useful Improvements in Recording Flow-Meters, of which the following is a specification.

This invention relates to instruments for measuring the flow of a fluid through a conduit, and its object is to provide an efficient and simple device which will not be disarranged by sudden or violent fluctuations in the flow of said fluid, but will respond promptly and accurately to all variations, whether great or small.

The type of meter to which the invention relates is that in which a U-shaped tube containing mercury is connected to the higher and lower pressure regions of a pressure-difference device interposed in the path of the fluid column. This device may be a Venturi tube, a Pitot tube, or a modification thereof. For the sake of convenience, the two differing pressure regions of this device will be hereinafter referred to as "leading" and "trailing", the former being the higher and the latter the lower.

The leading leg of the tube is preferably a bowl-shaped receptacle and on the mercury therein there rides a float of magnetic material which lies between the poles of a U-shaped magnet located outside of said bowl and supported by a counterbalanced lever. The rise and fall of the float cause the magnet and lever to rise and fall correspondingly, and the movements of the lever are recorded on a moving chart. If a plain flat ring was used as a float it might tend to lag during small deflections, due to the possibility of one of the U-magnet poles attracting it with greater force than its mate and thereby causing the float to be drawn against one side of the bowl and offer frictional resistance to vertical movement. To overcome this friction, the float is so designed that the mercury is given two paths for movement, one inside and one outside the float. The inner passage is restricted and offers greater resistance to the movement of the mercury than the outside passage. This will cause the mercury to rise faster in said outside passage, in case the float should lag. Should such action occur, the float will be rendered more buoyant by a force equal to the difference in weight between mercury and water of the volume so displaced. When movement occurs in the opposite direction the float is similarly overweighted by any overdeflection downward of the mercury in the outer path. The beneficial effect of this action is to start the float moving by overcoming the friction and inertia of rest through the sudden application of the extra power due to a mercury "head".

The trailing leg of the instrument is a glass tube rising above the bowl and containing a liquid column whose lower portion is composed of a substance such as carbon tetrachlorid suitably colored, while the upper portion of said column is clear water. The deflections of the mercury in the bowl are communicated to the liquid column, and the rise and fall of the upper end of the tetrachlorid constitute an accurate and dependable form of visible indication, because the mercury and the liquid make the prime moving element.

In the accompanying drawing, Figure 1 is a side elevation of my improved flow meter, partly broken away, and Fig. 2 is a front elevation, partly in section.

A bracket 1 is secured by lugs 2 to the boiler or other suitable support. Rising therefrom is a casing 3 having openings 4 in each side to expose to view the glass tube 5 whose upper end connects with the pipe 6 which runs to the trailing side of the pressure-difference device. The lower end of the tube connects by a packed joint 7 with a narrow passage 8 in the casing leading to a chamber 9 formed by a tube 10 extending downwardly from a recess in said casing, and having a downwardly projecting neck 11 of smaller diameter. Secured to the lower end of the casing by a union 12 is a receptacle of non-magnetic material, such as brass, having a lining 14 of glass or the like and containing a mass of mercury 15. The receptacle is preferably bowl-shaped, and is concentric with the tube 10. The mercury passes up through the neck 11 and partly fills the chamber 9. A quantity of carbon tetrachlorid 16 fills the rest of the chamber 9 and extends up into the glass tube 5 far enough to be visible through the openings 4. A float 17 rests on the mercury in the chamber 9 and has a wire indicator 18 projecting up through the passage 8 into the tube 5, to afford a visible index of the level of the mercury. The space in the bowl above the mercury connects by a passage 19 and a pipe 20 with the leading side of the pressure-difference device.

The instrument above described will operate as a visible indicator of the varying rates of flow of fluid through the conduit containing the pressure-difference device. In order to obtain a permanent record of such variations, I have introduced into the bowl 13 a float 21 of magnetic material, riding freely on the mercury. The float is tubular and encircles the tube 10, its upper end rising above the surface of the mercury and its lower end having an internal flange 22 which approaches the neck 11, and forms with said neck and the tube 10 a restricted annular passage for the mercury. In the space outside the float, between it and the bowl, the mercury can rise and fall freely. A U-magnet 23 passes under the bowl and extends up on opposite sides thereof, having pointed pole pieces 24 projecting toward said bowl. The float 21 is preferably provided with pointed lugs 25 in line with said pole pieces. The magnet is pivotally hung on a bifurcated lever 26 suitably fulcrumed on screws 27 tapped through the sides of a casing 28 attached to the under side of the bracket 1. A weight 29 on the other end of the lever counterbalances the magnet 23. An arm 30 attached to the lever carries a marking point 31 which records upon a graduated chart the movements of said lever. The chart is preferably a circular disk 32 rotated at a uniform speed by clockwork 33; chart and clockwork being housed in the casing 28, and the former being visible through a sheet of glass 34 covering an opening in said casing in front of the chart. When a variation between the leading and trailing pressures occurs, the mercury in the bowl is deflected either up or down, as the case may be. In any event, it moves more easily in the outer space between the bowl and the float than it does in the inner space between the float and the tube 10, owing to the restricted entrance to said latter space. The float may tend to lag behind the mercury, owing to inertia and friction against the bowl or the neck 11. The variation in the level of the mercury between inside and outside the float tends to exert an extra force to move said float. In moving, it carries the lugs 25 out of line with the pole pieces 24, which lengthens the path for the magnetic flux between the poles of said magnet and causes them to follow the float up or down. The resulting vibration of the lever 26 is recorded by the marking point 31 on the chart 32. Should the float tend to drop to an abnormal depth in the bowl, it will be arrested by an annular stop 35 on the neck 11 which engages the flange 22 of the float and prevents it from moving farther downward.

The deflections of the mercury are indicated in the glass tube 5 by the wire indicator 18, while the rise and fall of the carbon tetrachlorid in said tube is much greater than the mercury deflections owing to the difference between the diameters of the tube 5 and the chamber 9. Conical bosses 36 on the inner float 17 act as valves to close the passage 8 or the neck 11 in case of abnormal deflections of the mercury; thus preventing any disarrangement of the meter.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A fluid flow meter of the U-tube mercury type, having a non-magnetic receptacle for the mercury, a movable magnet having its poles adjacent to said receptacle, a tubular float of magnetic material riding on the mercury between the poles of said magnet, means restricting the opening through the tubular float whereby the mercury has greater freedom to rise and fall outside of said float than inside thereof, and means for recording the movements of said magnet.

2. A fluid flow meter having a casing, a glass tube therein, a non-magnetic mercury receptacle suspended from said casing, a tube communicating with said glass tube and depending into said receptacle, a tubular float of magnetic material riding on the mercury and encircling said depending tube, a movable U-magnet outside said receptacle having its poles in line with said float, and means for recording the movements of said magnet.

3. A fluid flow meter having a casing provided with a recess, a glass tube therein, communicating with said recess, a tube depending from said recess and having a downwardly-projecting neck, a mercury receptacle of non-magnetic material suspended from said casing and inclosing said tube, a tubular magnetic float riding on the mercury and encircling said depending tube, means defining a restricted passage between said float and said depending tube, a movable U-magnet underlying said receptacle and having its poles in line with said float, and means for recording the movements of said magnet.

4. A fluid flow meter having a casing provided with a recess, a glass tube therein, communicating with said recess, a tube depending from said recess and having a downwardly-projecting neck, a mercury receptacle of non-magnetic material suspended from said casing and inclosing said tube, a tubular magnetic float riding on the mercury and encircling said depending tube, an internal flange at the bottom of said float approaching said neck, a movable magnet outside said receptacle adapted to be influenced by the movements of said float, and means for recording the movements of said magnet.

5. In an indicating device, a receptacle, a mass of mercury therein, an annular float riding on said mercury and an inwardly projecting flange on one edge of said float serving to restrict the opening therethrough, whereby an over-deflection of the mercury can occur along the outer surface of said float to exert a starting effect upon said float.

6. In an indicating device, a receptacle, a mass of mercury therein, an annular float riding thereon, and means for restricting the rise and fall of the mercury along one surface of said float, whereby the overdeflection of the mercury along the other surface will exert a starting effect upon said float.

In witness whereof, I have hereunto set my hand this 10th day of October, 1912.

JAMES WILKINSON.

Witnesses:
 BENJAMIN B. HULL,
 HELEN ORFORD.